A. D. BELL.

Improvement in Apparatus for Carbureting Air.

No. 4,890. Reissued May 7, 1872.

Witnesses:

J. E. Lundy

Wm. B. Lewis

Inventor

Alexander Graham Bell

AM. PHOTO LITHOGRAPHIC CO. N. Y. (OSBORNE'S PROCESS.)

UNITED STATES PATENT OFFICE.

ALEXANDER DALRYMPLE BELL, OF SAN FRANCISCO, CALIFORNIA, ASSIGNOR TO JOSEPH WESLEY STOW, OF SAME PLACE.

IMPROVEMENT IN MACHINES FOR THE MANUFACTURE OF PNEUMATIC GAS.

Specification forming part of Letters Patent No. 112,111, dated February 28, 1871; reissue No. 4,890, dated May 7, 1872.

SPECIFICATION.

*To all whom it may concern:*

Be it known that I, ALEXANDER DALRYMPLE BELL, of the city and county of San Francisco, in the State of California, have invented an Improvement in Machines for Manufacturing Pneumatic Gas. The following is a description of my invention, reference being had to the accompanying drawing.

In the manufacture of pneumatic gas if the carbureters used are too large the air in its passage through them becomes overcharged with hydrocarbon vapors, and to avoid this result it is found necessary to reduce the size of the carbureters until another difficulty is encountered in the refrigeration of the hydrocarbon liquid caused by its rapid evaporation. When the air-pump or other apparatus for forcing the air through the carbureters is driven by weights, springs, or clock-work, very perfect workmanship and consequently expensive machinery is required to secure a uniform pressure, because of irregularities in friction on the working parts of the machine. Like all machinery, the various parts of pneumatic gas-machines will sometimes get out of order, and in such instances an entire town may be left in sudden darkness. The object of my invention is to obviate each of these difficulties.

My invention consists in combining two sets of apparatus for generating pneumatic gas into one machine in such a manner that when refrigeration takes place in one carbureter or set of carbureters the other one or other set will commence acting and allow the first to regain a suitable temperature by the absorption of heat from its surroundings; also, in such a manner that when weights, springs, clock-work, or other motive power is employed for driving the air-forcing apparatus a uniform pressure of gas is maintained; also, in such a manner that when any accident, clogging, or hindrance of any kind interferes with the action of any part of the machine, that the other corresponding part will at once take up, and continue the action lost by the hindered part, and thus keep the machine in operation and the burners supplied with gas while the injury continues or repairs are being made.

Figure 1:
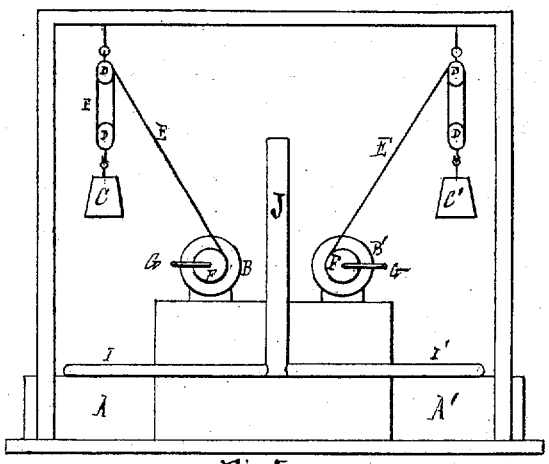
Figure 2:
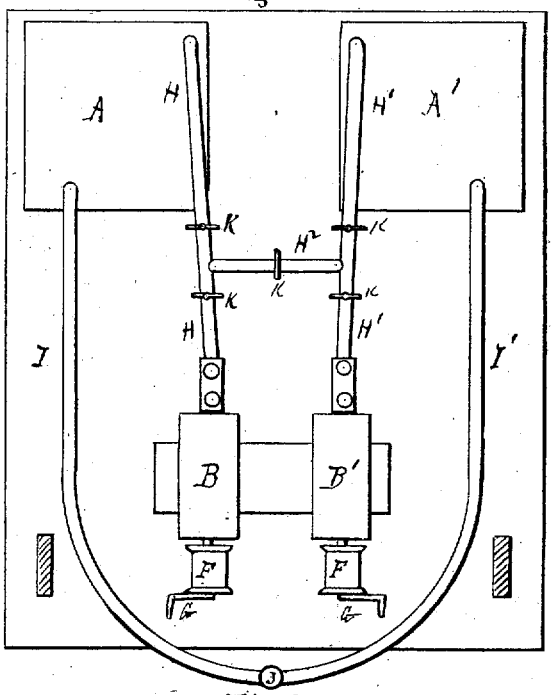

In the accompanying drawing, Figure 1 is an elevation of an apparatus for the manufacture of pneumatic gas embodying my improvement. Fig. 2 is a plan of the same with certain parts removed.

Each part is distinguished by the same letter whenever it appears in the drawing.

A and A′ are the carbureters. B and B′ are rotary air pumps or machines for forcing the air through the carbureters. The motive power is derived from weights C and C, and is communicated to the machines B and B by means of the blocks D, cords E, and reels F. The weights may be wound up by means of cranks G. The air is conveyed to the carbureters by means of the pipes H, $H^1$, and $H^2$, where it absorbs the vapors of gasoline or other hydrocarbon liquid and becomes converted into pneumatic gas, and from the carbureters it passes through the pipes I and I′ to the delivery-pipe J.

It will be seen that this apparatus consists of two complete pneumatic gas-machines united together by means of the cross-pipe $H^2$, and discharging through one and the same delivery-pipe. The interior construction of the carbureters is not shown, because my invention is applicable to any kind of carbureter used in the manufacture of pneumatic gas; and my invention is equally applicable to any kind of air-pump that may be employed. The air-pumps shown in the drawing are of that class the speed of which is regulated by the pressure of the compressed air or gas contained in the carbureter and pipes, and the stopping and starting of which are effected by the increase or diminution of said pressure.

By means of the five stop-cocks K either or both air-pumps may be caused to force air through either or both carbureters or either carbureter; or either air-pump may be disconnected for repairs.

In the apparatus represented in the drawing, if all escape of gas from the delivery-pipe is prevented by shutting the cocks of the burners, the weights will descend until the pressure of the gas becomes sufficient to balance them. If one or more of the cocks of the burners be then opened, the heavier weight only will descend if one is heavier than the other, and the gas will only be generated in the carbureter through which that weight forces the air; but if anything should impede or interfere to check the descent of the heavier weight, the lighter weight would immediately begin to move and the gas would be supplied from the other carbureter. If the weights are equal, that one will move first that has the least friction of rope and sheave to overcome, and will continue to move until something impedes or retards it, and thereby allows the pressure of gas to decrease sufficiently to start the second weight. To maintain a uniform pressure of gas the weights should be made as nearly equal as possible, and may be regulated or adjusted by additional weights after the machines are in operation; and to provide against refrigeration, an extra weight or weights may be provided that may be added to either side, as required, in order to allow the carbureter in which the refrigeration takes place to recover its proper temperature. Of course, stops or impediments can be so arranged at suitable heights or distances as to cause an alternate operation of the weights to take place automatically.

It has been found by actual trial that with a carbureter of the proper size in proportion to the number of lights, refrigeration to an injurious extent takes place in about four hours; therefore, if the weights in Fig. 1 occupy each four hours in descending to the floor, and one of them is made heavier than the other, the heavy one will supply the gas for the first four hours and until refrigeration takes place; but as soon as it touches the floor the light weight will begin to descend and produce the gas from the other carbureter for the next four hours; or a single air-pump may be used and its air directed alternately through the carbureters, changing from one to the other every four hours when the object is simply to prevent refrigeration. When a fan or other continuously-blowing machine is used for forcing the gas into a reservoir or holder, as in large works for supplying a town or city, my invention is also applicable, for it is evident that by having two sets of carbureters the blast can be shut off from one and be directed through the other when refrigeration has taken place.

Having thus described my invention, what I claim as new, and desire to secure by Letters Patent, is—

1. In an apparatus for the manufacture of pneumatic gas, the combination of two carbureters or two sets of carbureters acting alternately, in a manner substantially as described, and for the purpose of preventing excessive refrigeration, substantially as described.

2. In an apparatus for the manufacture of pneumatic gas, the combination of the air-pumps B and B′, arranged to operate in a manner substantially described, and for the purpose set forth.

3. The combination, in one machine, of two complete sets of apparatus for generating pneumatic gas, in a manner substantially as hereinbefore described, and for the purposes hereinbefore set forth.

4. The connecting-pipe $H^2$ or its equivalent in an apparatus for the manufacture of pneumatic gas, arranged to operate in a manner substantially as described, and for the purposes set forth.

5. In an apparatus for the manufacture of pneumatic gas, the combination of the stop-cocks K, arranged to operate in a manner substantially as described, and for the purposes set forth.

In testimony whereof I have hereto set my hand this 4th day of April, A. D. 1872.

ALEXANDER D. BELL.

Witnesses:
J. L. BOONE,
A. T. DEWEY.